United States Patent [19]

Brauer et al.

[11] Patent Number: 5,360,902
[45] Date of Patent: Nov. 1, 1994

[54] PROCESS FOR PRODUCING METHYL HYDROXYALKYL CELLULOSE ETHERS

[75] Inventors: Oke Brauer; Bernd Haase; Dieter Herzog; Lutz Riechardt; Gerd Sonnenberg, all of Walsrode; Dietrich Tegtmeier, Bergisch-Gladbach, all of Germany

[73] Assignee: Wolff Walsrode AG, Walsrode, Germany

[21] Appl. No.: 990,867

[22] Filed: Dec. 15, 1992

[30] Foreign Application Priority Data

Dec. 23, 1991 [DE] Germany .............................. 4142761

[51] Int. Cl.$^5$ .......................... C02F 1/44; C08B 11/08; C08B 11/20; C08B 11/22
[52] U.S. Cl. ......................................... 536/84; 536/85; 536/91; 210/650; 210/651
[58] Field of Search ............... 210/650, 702, 723, 730, 210/767, 759, 760, 651; 536/84, 85, 91

[56] References Cited

U.S. PATENT DOCUMENTS 4,672,113 6/1987 Wallisch et al. ...................... 536/85
5,218,107 6/1993 Schulz ................................... 536/84

FOREIGN PATENT DOCUMENTS 0136518 4/1985 European Pat. Off. .

OTHER PUBLICATIONS

Klinkowski "Ultrafiltration" *Encyclopedia of Polymer Science and Engineering* vol. 17, pp. 75–107, John Wiley & Sons, USA (1989).

*Primary Examiner*—John Kight, III
*Assistant Examiner*—Jeffrey Culpeper Mullis
*Attorney, Agent, or Firm*—Sprung Horn Kramer & Woods

[57] ABSTRACT

The present invention relates to a process for producing methyl hydroxyalkyl cellulose ethers by alkalisation and etherification of celluloses, rinsing the methyl hydroxyalkyl cellulose ethers with water at higher temperatures and recovering the short-chain cellulose ethers that are soluble in the wash water, wherein the wash water containing sodium chloride and organic by-products is passed across a first stage of a membrane filtration having a molecular cut size of 200 to 150,000 Dalton, is concentrated during this process and passes across a second stage of a membrane filtration.

9 Claims, No Drawings

PROCESS FOR PRODUCING METHYL HYDROXYALKYL CELLULOSE ETHERS

The invention relates to a process for producing methyl hydroxyalkyl cellulose ethers.

In the production of methyl hydroxyalkyl cellulose ethers the cellulose raw material is alkalised with aqueous caustic-soda solution. The resulting alkali cellulose is etherified with etherification agents such as methyl chloride, ethylene oxide and propylene oxide. After reaction has taken place the methyl hydroxyalkyl cellulose ethers are present in solid form in the reaction mixture, from which they are separated by filtration or centrifugation. After separation they contain sodium chloride and organic reaction by-products such as methanol and glycols. These pollutants have to be removed by washing the methyl hydroxyalkyl cellulose ethers.

It is known (Houben-Weyl, Vol. 20 Makromolekulare Stoffe, p. E2057) that suitable purification of the cellulose ethers which are insoluble in water at relatively high temperatures can be achieved quite satisfactorily by washing with hot water.

Furthermore, it is known (Ullmanns Encyclopedia of Industrial Chemistry, Vol. 5, p. 467) that soluble portions of hemicellulose ethers or short-chain oligomers go into the wash water with the salt. This reduces the yield, particularly with types of cellulose ether of low viscosity.

A process for recovering the short-chain cellulose ethers from the wash water has now been discovered and is characterised in that the wash water containing sodium chloride and organic by-products is passed at temperatures from 30° to 90° C. across a first stage of membrane filtration having a molecular cut size of 200 to 150,000 Dalton, is concentrated in this process, the concentrate thereby obtained is mixed with water in a ratio from 1:1 to 1:30, this concentrate diluted with water is passed at temperatures from 30° to 95° C. across a second stage of a membrane filtration having a molecular cut size of 200 to 150,00 Dalton, is again concentrated, and the concentrate which is largely free from sodium chloride and organic pollutants is added to the washed methyl hydroxyalkyl cellulose ethers, or alternatively the methyl hydroxyalkyl cellulose ethers of low viscosity that are contained in the concentrate are recovered as solid substance.

At both the first and the second membrane filtration stage of the process according to the invention, use is preferably made of membranes having a molecular cut size of 200 to 15,000 Dalton.

The process according to the invention is preferably carried out at the first membrane filtration stage at temperatures from 35° to 65° C. and at pressures from 5 to 20 bar.

At the second membrane filtration stage according to the invention temperatures of 50° to 75° C. and pressures from 5 to 25 bar are preferably applied.

The wash water of the cellulose ethers at the first membrane filtration stage according to the invention is preferably concentrated 8 fold to 20-fold, depending on the concentration of the low-viscosity methyl hydroxyalkyl cellulose ethers in the wash water. At the same time a concentration of low-viscosity methyl hydroxyalkyl cellulose ethers in the concentrate of 25 to 50 g/l, determined as the sum total of carbohydrates, is preferably adjusted.

The ratio of added water to the concentrate obtained from the first membrane filtration stage according to the invention is preferably adjusted to be between 6:1 and 10:1.

The process according to the invention is preferably carried out in membrane installations constructed from tubular modules or spiral-wound membrane elements.

In order to recover variable qualities of product or to increase the operating life of the membranes it can be advantageous to subdivide both the first and the second membrane stage once more and to provide them with membranes of variable molecular cut size.

With the process according to the invention it can be advantageous to concentrate still further the concentrate obtained at the second membrane filtration stage before adding it to the washed methyl hydroxyalkyl cellulose ethers.

All available organic and inorganic materials can be used as membrane materials. For the theory and application of membrane processes, reference is made to, e.g. H. Strathmann: Chemie-Technik 7, 33 (1978), W. Pusch and A. Walch; Angew. Chemie 94, 670 (1982), K. Marquardt, Abfallwirtschaft Journal 2 (1990), No. 4, page 177 or R. Rautenbach and A. Rüschl; Technische Mitteilungen, Year 82, Issue 6, November/December 1989, page 400 ff.

By way of membrane elements tubular modules, spiral-wound modules or plate modules can be used.

A prerequisite for the applicability of membrane filtration processes is that the component to be isolated is withheld by a membrane. But for reasons of economy a sufficient permeate flow must also be provided, since the size of the permeate flow ascertained and the set amount of liquid to be processed determine the required membrane surface, which determines the investment costs and also the operating costs of such an installation. The permeate flow increases with the pore size of the membrane, or with the stated value in Dalton for the molecular cut size and the pressure and the temperature of the liquid which is to permeate. The permeate flow is frequently stated as the specific daily capacity $1/m^2d$. The increase in the permeate flow is normally directly proportional to the pressure. As a rule of thumb it may be taken that an increase in temperature by 10° C. causes the permeate flow to increase by 30%.

With the process according to the invention wash waters from methyl hydroxyalkyl cellulose production can be processed irrespective of the type of cellulose raw material employed. When using either cotton linters or wood pulp with variable proportions of hemicelluloses, the cellulose ethers contained in the wash water can be successfully isolated with an effectiveness of over 90%.

With the process according to the invention the above-mentioned effectiveness of the recovery of cellulose ethers contained in the wash water is independent of the degree of substitution.

The process according to the invention can be applied with particularly advantage when high proportions of wood celluloses are used in the production of the methyl hydroxyalkyl cellulose ethers. Here the proportion of useable cellulose alters dissolved in the wash water is particularly high. The desired economic effect is considerable and the production yield of methyl hydroxyalkyl cellulose ethers can be increased by up to 3%.

The advantages of the process according to the invention are also shown particularly well in the production of methyl hydroxyalkyl cellulose ethers of low viscosity. Here too, the proportion of dissolved and useable constituents is high.

An advantage of the process according to the invention that the recovered useable cellulose ethers are largely free from organic pollutants, primarily glycols and polyglycols, which still constituted a component of the wash water, but oligomers of low molecular weight are also removed with the admixed water at the second membrane filtration stage.

The slightly saline permeate accruing at the second range can be fed back into the process to be used as wash water, so that as a result of the admixing of water to the concentrate from the first membrane stage in accordance with the invention there is no increase in effluent pollution or in water consumption for the overall process.

A further significant advantage of the process according to the invention is that the recovered useable cellulose ethers in the wash water to be disposed of represent a demand for chemical oxygen which is not easily biodegradable, and this pollution environmental factor is eliminated together with the costs to which it gives rise.

In comparison with the slate of the art it is unexpected that with regard to the permeate flow, which determines the economy of the process, the filtration membranes having a molecular cut size of 5000 to 30,000 Dalton exhibit a uniform and better permeate flow than a microfiltration membrane of 0.1 pm pore size. It is also surprising that there are temperature-dependent regions in which better permeate flows can be achieved at lower pressures than at higher pressures , which has a beneficial effect on energy consumption and thereby on the operating costs of the process according to the invention.

The examples given below serve Lo elucidate the process according to the invention.

EXAMPLE 1

In the production of methyl hydroxyalkyl cellulose ethers from wood pulp with an alpha-cellulose content of 93.8%, a degree of substitution of 1.6 and a viscosity of 40,000 mPas, determined in 2% aqueous solution, there accrued during purification of the methyl hydroxyalkyl cellulose ethers, 2,6 m$^3$/h of wash water with a content of cellulose ethers, determined as the sum total of carbohydrates, of 4.4 g/l and of sodium chloride amounting to 10.3 g/l. The wash water was continuously subjected to membrane filtration, By way of membrane a polyether sulphone tubular membrane was used which had a molecular cut size of 8000 Dalton.

Membrane filtration was carried out at a pressure of 4.8 bar and at 65° C. Every hour 0.26 m$^3$ of concentrate was removed with a carbohydrates content of 41.9 g/l and a sodium chloride content of 10.4 g/l. The permeate flow amounted to 750 l/m$^2$d.

The concentrate was continuously mixed with 1.82 m$^3$/h at a further membrane filtration. Here too, a polyether sulphone tubular membrane was used which had a molecular cut size of 8000 Dalton.

Membrane filtration was carried out at a pressure of 5.3 bar and at 65° C. 0.26 m$^3$/h of concentrate was removed with a carbohydrates content of 41.7 g/l and a sodium chloride content of 0.02 g/l. The permeate flow amounted to 910 l/m$^2$d.

The permeate was fed back to the process for washing the methyl hydroxyalkyl cellulose ether.

The concentrate obtained was added to the purified methyl hydroxyalkyl cellulose ether. The proportion of cellulose ethers recovered from the wash water amounts to 94.8%. The degree of substitution of these cellulose ethers is identical with the degree of substitution of the purified methyl hydroxyalkyl cellulose ethers.

EXAMPLE 2

Cotton linters with an alpha-cellulose content of were used as raw material in accordance with Example 1. The degree of substitution amounted to 1.57 and the viscosity was 14,200 mPas. The wash water had a carbohydrates content of 1.2 g/l.

0.13 m$^3$/h of concentrate having a carbohydrates content of 23 g/l was removed. The permeate flow amounted to 820 l/m$^2$d.

At the second membrane filtration stage the concentrate from the first membrane filtration stage was mixed with 0.91 m$^3$/h water. 0.13 m$^3$/h of concentrate with a carbohydrates content of 22.5 g/l was removed. The proportion of cellulose ethers recovered from the wash water amounts to 93.7%.

The permeate flow at the first membrane filtration stage amounted to 830 l/m$^2$d, and at the second to 1140 l/m$^2$d.

EXAMPLE 3

In accordance with Example 2, the viscosity of the methyl hydroxyalkyl cellulose ether amounted to 295 mPas. The wash water had a carbohydrates content of 1.73 g/l.

As in Example 2, 0.13 m$^3$/h of concentrate was removed. The carbohydrates content amounted to 32 g/l. The proportion of cellulose ethers recovered from the wash water amounts to 92.5%.

The permeate flow at the first membrane filtration stage amounted to 770 l/m$^2$d and at the second stage to 990 l/m$^2$d.

EXAMPLE 4

In accordance with Example 1, the pressure at the first membrane filtration stage was raised from 5.3 to 8.75 bar. The permeate flow was reduced to 640 l/m$^2$d.

At the second membrane filtration stage the temperature was increased to 75° C. The permeate flow increased to 1030 l/m$^2$d.

EXAMPLE 5

In accordance with Example 1, the temperature at the first membrane filtration stage was raised to 75° C. The permeate flow was reduced to 530 l/m$^2$d.

Corresponding to Example 4, the pressure at the second membrane filtration stage was increased to 8.75 bar. The permeate flow was almost unchanged at 1010 l/m$^2$d.

EXAMPLE 6

Corresponding to Example 1, use was made at the first membrane filtration stage of an acrylic tubular membrane having a molecular separating cut of 150,000 Dalton. Under the same conditions as in Example 1 the permeate flow at the first stage amounted to 720 l/m$^2$d, and at the second ultra-filtration stage to 1260 l/m$^2$d.

The carbohydrates content in the concentrate from the first stage amounted to 38.4 g/l, and that from the second stage to 37.2 g/l. The proportion of cellulose ethers recovered from the wash water amounts to 84.5%.

EXAMPLE 7

Corresponding to Example 1, at the first filtration stage a polyester tubular microfiltration membrane which had a pore size of 0.1 μm was used instead of the filtration membrane having a molecular cut size of 8000 Dalton.

Microfiltration was carried out at a permissible pressure for the membrane of 3 bar and at 65° C. The permeate flow amounted to 350 l/m²d.

EXAMPLE 8

Corresponding to Example 7, at the first filtration stage a ceramic tubular microfiltration membrane was used which had a pore size of 0.1 μm.

Microfiltration was effected at a pressure of 8.75 bar and at a temperature of 70° C. The permeate flow amounted to 280 l/m²d.

EXAMPLE 9

Corresponding to Example 1, at the first and the second filtration stage a polyether solphone spiral wound membrane was used which had a molecular cut size of 500 Dalton. At the first and the second stage the filtration was carried out at a pressure of 19 bar and at 35° C.

At the same degree of concentration and deselimination the permeate flow at the first stage amounted to 140 l/m²d and that from the second stage amounted to 220 l/m²d.

We claim:

1. In a process for producing methyl hydroxyalkyl cellulose ethers by alkalisation and etherification of celluloses and rinsing the methyl hydroxyalkyl cellulose ethers with water and recovering the short-chain cellulose ethers that are soluble in the wash water, the improvement which consists of passing the wash water containing sodium chloride and organic by-products at temperatures from 30° to 90° C. across a first stage of a membrane filtration apparatus having a molecular cut size of 200 to 150,000 Dalton, thereby concentrating the wash water, mixing the concentrate thereby obtained with 1 to 30 times its quantity of water diluting this concentrate with water add passing it at temperatures from 30° to 95° C. across a second stage of a membrane filtration apparatus having a molecular cut size of 200 to 150,000 Dalton, again concentrating and adding the concentrate which is substantially free from sodium chloride and organic pollutants to the washed methyl hydroxyalkyl cellulose ethers, or alternatively recovering as solid substances the methyl hydroxyalkyl cellulose ethers of low viscosity that are contained in the concentrate.

2. Process according to claim 1, wherein filtration membranes are used which have a molecular cut size of 5000 to 15,000 Dalton.

3. Process according to claim 1, wherein the temperatures at the first ultrafiltration stage range from 35° to 65° C. and the pressures lie between 5 and 20 bar.

4. Process according to claim 1, wherein the temperature at the second membrane filtration stage range from 50° to 75° C. and the pressures lie between 5 and 25 bar.

5. Process according to any of claim 1, wherein at the first membrane filtration stage concentration is effected in a ratio from 1:8 to 1:20.

6. Process according to claim 1, wherein the ratio of added water at the second membrane filtration stage to the amount of concentrate from the first ultrafiltration stage is between 6:1 and 10:1.

7. Process according to any of claim 1, wherein by way of membrane installation tubular modules or spiral-wound membrane elements are used.

8. Process according to any of claim 1, wherein the first and second membrane filtration stages are both subdivided and provided with membranes of different molecular cut size.

9. Process according to any of claim 1, wherein the concentrate from the second stage of the membrane filtration is concentrated before being added to the washed methyl hydroxyalkyl cellulose ethers.

* * * * *

UNITED STATES PATENT AND TRADEMARK OFFICE
CERTIFICATE OF CORRECTION

PATENT NO.   : 5,360,902
DATED        : November 1, 1994
INVENTOR(S)  : Brauer, et al.

It is certified that error appears in the above-indentified patent and that said Letters Patent is hereby corrected as shown below:

Title page, sixth inventor's name should read "Dietrich Tegtmeyer"

Column 6, line 4, after "water" delete "add" and substitute --and--

Column 6, line 31, delete "any of"

Column 6, line 34, delete "any of"

Column 6, line 38, delete "any of"

Signed and Sealed this

Nineteenth Day of May, 1998

*Attest:*

BRUCE LEHMAN

*Attesting Officer*          *Commissioner of Patents and Trademarks*